(12) United States Patent
McClure et al.

(10) Patent No.: US 7,793,160 B1
(45) Date of Patent: Sep. 7, 2010

(54) SYSTEMS AND METHODS FOR TRACING ERRORS

(75) Inventors: Steven T. McClure, Northborough, MA (US); Steven R. Chalmer, Auburndale, MA (US); Brett D. Niver, Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 663 days.

(21) Appl. No.: 11/091,910

(22) Filed: Mar. 29, 2005

(51) Int. Cl.
 *G06F 11/00* (2006.01)
(52) U.S. Cl. .............................. 714/45; 714/38; 714/37; 717/128; 717/127; 717/129
(58) Field of Classification Search .................. 714/45; 717/127–129
 See application file for complete search history.

(56) References Cited

U.S. PATENT DOCUMENTS

| | | | |
|---|---|---|---|
| 5,319,760 A | 6/1994 | Mason et al. | |
| 5,325,526 A | 6/1994 | Cameron et al. | |
| 5,349,680 A | 9/1994 | Fukuoka | |
| 5,428,779 A * | 6/1995 | Allegrucci et al. | 718/108 |
| 5,526,485 A * | 6/1996 | Brodsky | 714/38 |
| 5,630,130 A | 5/1997 | Perotto et al. | |
| 5,655,096 A | 8/1997 | Branigin | |
| 5,940,617 A * | 8/1999 | Tamura | 717/128 |
| 5,943,498 A * | 8/1999 | Yano et al. | 717/128 |
| 6,085,215 A | 7/2000 | Ramakrishnan et al. | |
| 6,108,683 A | 8/2000 | Kamada et al. | |
| 6,438,674 B1 * | 8/2002 | Perloff | 711/216 |
| 6,542,940 B1 | 4/2003 | Morrison et al. | |
| 6,662,297 B1 * | 12/2003 | Boom et al. | 712/245 |
| 6,687,903 B1 | 2/2004 | Chalmer et al. | |
| 6,708,326 B1 * | 3/2004 | Bhattacarya | 717/124 |
| 6,728,962 B1 | 4/2004 | Chalmer et al. | |
| 2003/0159133 A1 * | 8/2003 | Ferri et al. | 717/130 |
| 2003/0177476 A1 * | 9/2003 | Sarma et al. | 717/128 |
| 2004/0098642 A1 * | 5/2004 | Kaszycki et al. | 714/45 |
| 2005/0097398 A1 * | 5/2005 | Day et al. | 714/38 |
| 2006/0064676 A1 * | 3/2006 | Chavan | 717/124 |

* cited by examiner

*Primary Examiner*—Scott T Baderman
*Assistant Examiner*—Chae Ko
(74) *Attorney, Agent, or Firm*—Muirhead and Saturnelli, LLC

(57) ABSTRACT

Methods and systems consistent with the present invention may facilitate error tracing in computer software. Such methods and systems may maintain context information of a target process, swap from a context of the target process to a context of an error-tracing process, and trace an error from the target process using the error-tracing process and the context information of the target process.

20 Claims, 6 Drawing Sheets

```
#define TRACE_ERROR(cmd, symptom, category, modifier, pipe, options,
p_spec_buffer, severity)
{                              ─104                    ─106
        SAVE_DATA_BEFORE_TRACE_ERROR(options, &global_register_buffer);

trace_error_routine(FULL_ERR_CODE(cmd, symptom, category, modifier),
             ╱   (ULONG) (severity), (ULONG) (pipe), (UCHAR *) (p_spec_buffer),
  110 ──╱       (U_LONG) (options));
} define SAVE_DATA_BEFORE_TRACE_ERROR(options, p _register_buffer)
        if (((options) & M_ERR_SKIP_SAVE_REGS) == 0))
        {
                saveErrorRegistersInBuffer(p_register_buffer);
        }
                       ╲── 108
```

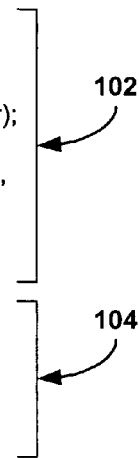

```
/* TRACE_ERROR -  This first executes a system call to save the general purpose
 *                registers in their exact state at the beginning of this macro. It then
 *                sets up a local structure with the various values passed into it,
 *                and finally makes another system call to trace the actual error,
 *                passing a pointer to the local structure we just set up. Note that
 *                software interrupts can not occur between these two specific
 *                system calls (the OS can ensure this.)
 */ define TRACE_ERROR(cmd, symp, cat, mod, pipe, opt, datalen, data)
{
        ErrTrace_t err;

/* Save the GPRs */
        SYSCALL_CALL(SYSCALL_REG_SAVE);

/* Now setup the strucuture */
        err.e_data      = (void *) (data);
        err.e_datalen   = (UINT32) (datalen);
        err.e_command   = (UINT8) (cmd);
        err.e_symptom   = (UINT8) (symp);
        err.e_category  = (UINT8) (cat);
        err.e_modifier  = (UINT8) (mod);
        err.e_pipe      = (UINT32) (pipe);
        err.e_options   = (UINT32) (opt);

/* Now trace the error with the pointer passed in */
        SYSCALL_CALL_PTR(SYSCALL_TRACE_ERR, (&err);
}
```

*FIG. 6*

SYSTEMS AND METHODS FOR TRACING ERRORS

CROSS-REFERENCE TO RELATED DOCUMENTS

This application expressly incorporates by reference, the entirety of U.S. Pat. No. 6,687,903, issued on Feb. 3, 2004, and U.S. Pat. No. 6,728,962, issued on Apr. 27, 2004.

BACKGROUND

1. Technical Field

The present invention generally relates to systems and methods for tracing errors in computer programs.

2. Related Art

Developers, engineers, and designers generally need to run and test software during development to evaluate its functionality and robustness. They may do this by using macros to trace various errors in the software. The macros, upon detecting an error, typically call a function to try to save the state of the register set, some additional hardware information, and/or the current stack, so that this information can be later retrieved. However, the function call, depending on the computer architecture, may change the information as the function is being invoked. This makes it difficult to obtain accurate information to debug the error and turns any function invoking the function call into a non-leaf function (i.e., a function that makes function calls).

Accordingly, it would be beneficial to provide a way to facilitate the tracing of errors in computer software.

SUMMARY OF EXEMPLARY EMBODIMENTS

Methods, systems, and articles of manufacture of the present invention may facilitate error tracing in computer software.

One exemplary embodiment of the invention relates to a method of error tracing. The method may comprise maintaining context information of a target process, swapping from a context of the target process to a context of an error-tracing process, and tracing an error from the target process using the error-tracing process and the context information of the target process.

Another exemplary embodiment of the invention relates to an error-tracing system, including memory and a processor. The memory and processor may be configured to maintain context information of a target process, switch from a context of a target process to a context of an error-tracing process, and trace an error from the target process using the error-tracing process and the context information of the target process.

Yet another exemplary embodiment of the invention relates to a computer-readable medium comprising instructions to configure a computer to perform a method of error tracing.

Additional embodiments and aspects of the invention are set forth in the detailed description which follows or may be learned by practice of methods, systems, and articles of manufacture consistent with the present invention. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 1 illustrates program code including exemplary error-tracing macros;

FIG. 6 illustrates exemplary code for error tracing, consistent with features and principles of the present invention.

DETAILED DESCRIPTION

Figure 2:
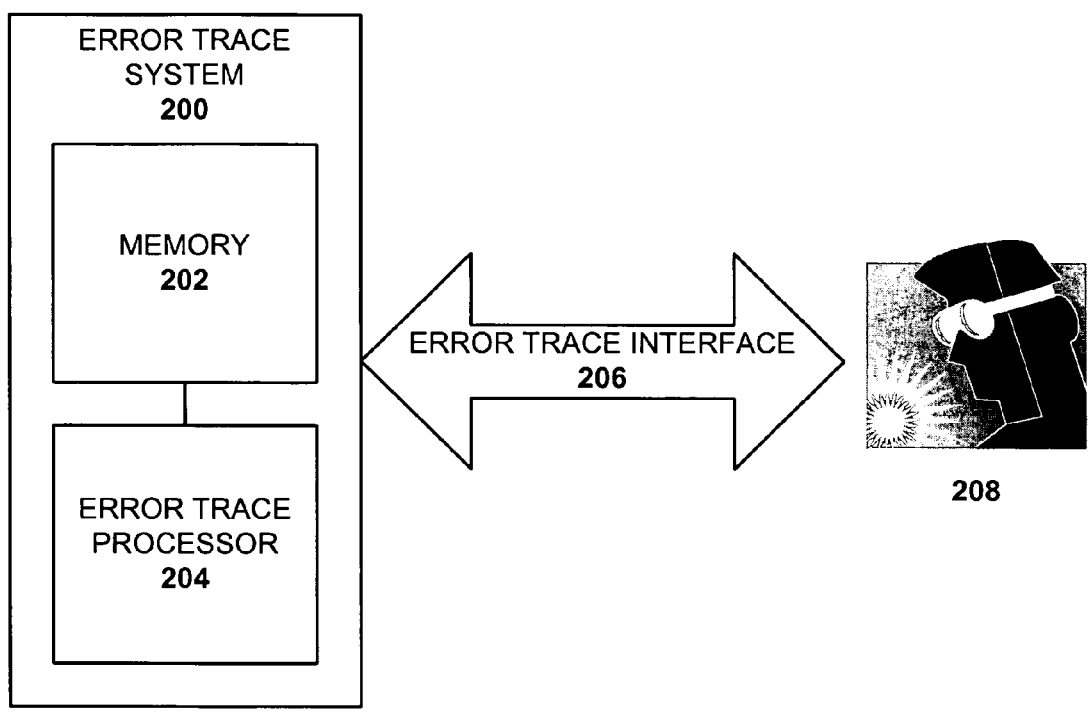
FIG. 2 illustrates an exemplary error-tracing system, consistent with features and principles of the present invention.

Reference is now made in detail to exemplary embodiments of the invention, examples of which are illustrated in the accompanying drawings. Wherever possible, the same reference numbers are used throughout the drawings to refer to the same or like parts.

In the embodiments disclosed herein, methods and systems may use system calls to facilitate error tracing and prevent leaf functions from becoming non-leaf functions. The system calls may allow error information to be accurately stored and retrieved, by removing function calls in the code path of error-handling code. Although some of the embodiments of the present invention are described in connection with system calls, other context-swapping mechanisms may be implemented to accurately store and use error information and/or non-error information. Accordingly, features and principles consistent with the present invention are not limited to system calls for facilitating error tracing or preventing leaf functions from becoming non-leaf functions.

In general, a computer system may execute many types of macros to trace different types of program execution errors. Most of these macros have some common characteristics. For instance, they typically call a function to store error information in a global buffer where it can be later retrieved for debugging or other purposes. However, the act of making the function call will often destroy the error information. That is, invoking a function call may change information stored in the computer's hardware registers, flags, program counter, machine state information, etc. If this information is important for debugging, then invoking the function call may alter the error information that the function call is actually trying to save.

For example, FIG. 1 illustrates exemplary macros 102 and 104. Macros 102 and 104 may be defined in a header file, such as an "error_trace.h" file, that is included in all instances of code using these macros. A program may call "TRACE_ERROR" macro 102, whenever the program detects an error via, for example, an exception, an interrupt, a flag, or any other type of signal. "TRACE_ERROR" macro 102 may first call "SAVE_DATA_BEFORE_TRACE_ERROR" macro 104, which in turn calls "saveErrorRegistersInBuffer" function 108, to try to save the information in the hardware registers to "global_regs_buffer" 106. After "SAVE_DATA_BEFORE_TRACE_ERROR" macro 104 saves the register information, "TRACE_ERROR" macro 102 calls "trace_error_routine" function 110 to perform the actual error trace.

Since "saveErrorRegistersInBuffer" function 108 is a function call, when invoked it has the potential to change some of the hardware registers and other information. Consequently, when "trace_error_routine" function 110 actually performs the error trace and analyzes the error information saved in "global_regs_buffer" 106, it may analyze inaccurate error information. Further, both of functions 108 and 110 may turn any leaf function calling "TRACE_ERROR" macro 102 into a non-leaf function since the leaf function will make function calls via macro 102. A leaf function is a function that does not make function calls, and consequently, requires less memory for stack space and fewer instructions than non-leaf functions.

Methods and systems consistent with certain aspects of the present invention may implement a context swap to save error information without alteration. Furthermore, methods and systems may implement a second context swap to trace the error itself, thereby removing all of the function calls in error tracing macros and preventing leaf functions from becoming non-leaf functions. Particularly, one may use a context swapping mechanism, such as a system call, of an operating system (OS) to generate an error trap. The OS may save context information for the main code path, swap context to run an error handler process, execute the error handler process, and then restore the context for the main code path (or potentially a different context if specified by the error handler process). Embodiments of the present invention may implement different system call parameters to call different error handlers in a very flexible manner. Further, methods and systems may use system calls to completely decouple the trace error code from the main code path and even allow a user to provide the error trace code in a separately linked software module.

Consistent with features and principles of the present invention, FIG. 2 illustrates an exemplary system 200 for error tracing. System 200 may include memory 202 and an error trace processor 204. A user or some other entity (human, software process, computer system, etc.) 208 may perform error tracing using system 200 via error trace interface 206. Any suitable combination of hardware, software, and/or firmware may be used to implement the above components. For example, system 200 may be a Symmetrix DMX platform from EMC Corporation of Hopkinton, Mass., configured with a Symm/K operating system and error-tracing software. Other systems may comprise the aforementioned error-tracing system. Additional examples of components that may implement system 200 are listed below.

Memory 202 may include on-board memory, cache memory, random access memory, flash memory, virtual memory, programmable read-only memory, or any other device for storing data.

Error trace processor 204 may include a mainframe, a laptop, a personal computer, a workstation, a computer chip, a digital signal processor board, an analog computer, and/or any other information processing device or combination of devices. Processor 204 may include a plurality of processors. The processors may be configured according to an asymmetric multiprocessing architecture, a symmetric multiprocessing architecture, or any other computer architecture. Further, error trace processor 204 may be implemented by a general purpose computer or data processor selectively activated or reconfigured by a stored computer program, or may be a specially constructed computing platform for implementing the features and operations disclosed herein.

Error trace interface 206 may include a graphical user interface, a command-line interface, a menu-driven interface, a shared memory interface, a network interface, a batch command file interface, an input/output interface, or any other mechanism for communicating with system 200. Error trace interface 206 and/or portions of system 200 may be implemented over a network, such as a local area network, a wide area network, an intranet, an extranet, the Internet, a telephone network, a wireless network, a wired network, or any other mechanism for communicating information.

Figure 3:
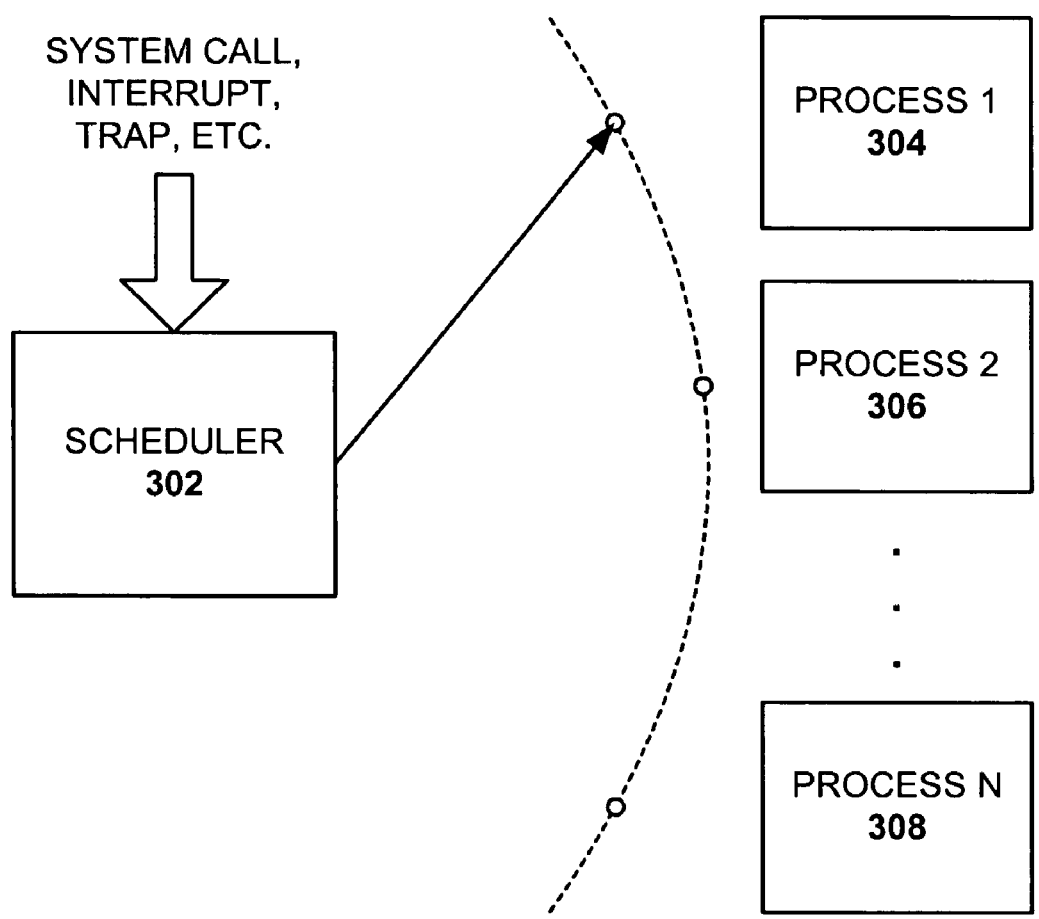
FIG. 3 illustrates an exemplary scheduler, consistent with features and principles of the present invention.

System 200 may be configured with multi-tasking software, such as a multi-tasking OS. Referring to FIG. 3, an exemplary multi-tasking OS, consistent with features and principles of the present invention, may include a scheduler 302 to manage execution of a plurality of processes 304-308. Scheduler 302 may itself be a process. Scheduler 302 may manage the execution of each process 304-308 by directing a program counter of processor 204 to point to code addresses corresponding to processes 304-308, respectively.

System 200 may invoke scheduler 302 by using a system call, an interrupt, or a software trap executed by a running software process. When scheduler 302 is invoked, scheduler 302 may examine the state of a currently running process to determine whether the process may be swapped out. If so, scheduler 302 may swap out the currently running process to run another process. The swapping may cause the program counter to be changed to that of an interrupt service routine, such as an error handler. The interrupt service routine may be a process (described below) for handling the system call, interrupt, or software trap.

Figure 4:
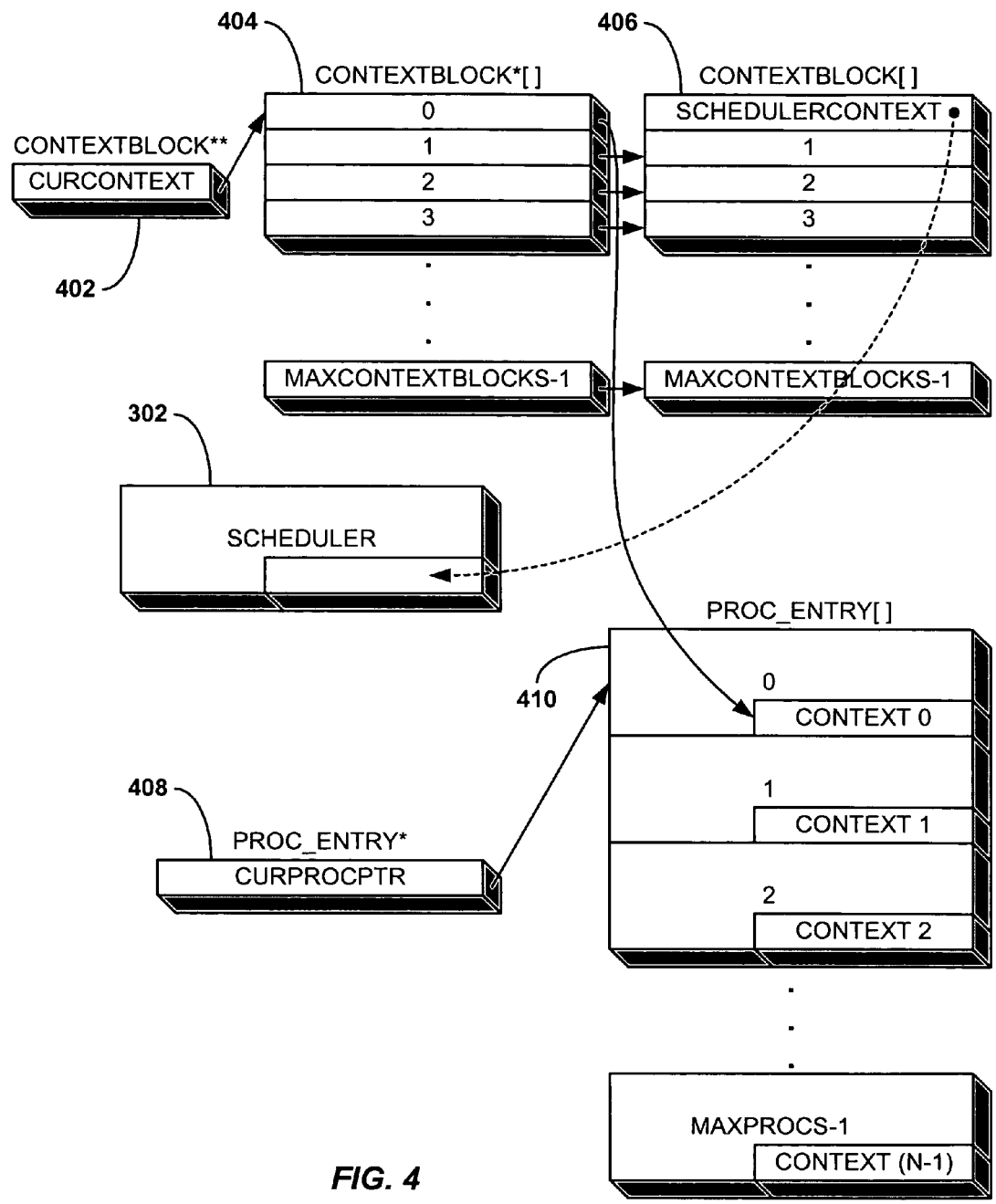
FIG. 4 illustrates a block diagram showing exemplary relationships between data used by a scheduler, consistent with features and principles of the present invention.

FIG. 4 illustrates a block diagram showing exemplary relationships between data used by scheduler 302 to handle scheduling and context swapping. FIG. 4 includes a current context pointer 402, an array of context block pointers 404, an array of context blocks 406, a current process pointer 408, and an array of process elements 410. Each of the context blocks in array 406 may include context information stored for a process in connection with a context swap. The context information may include, for example, values in hardware registers (e.g., general purpose registers, R0-R4 registers, etc.), values of flags, a program counter, machine state information, etc. Each of the process elements in array 410 may include code or a pointer to code for a particular process, and may include a context (stored in a context block separate from the context blocks in array 406) associated with the particular process. A process may be a thread, a task, or any other type of executing code.

In operation, current context pointer 402 points to one of the context block pointers in array 404, and each of context block pointers points to one of the context blocks in array 406. Similarly, current process pointer 408 points to one of the process elements in array 410. The process to which current process pointer 408 points is the one that is currently running (i.e., the one that has been scheduled by scheduler 302).

Furthermore, the zeroth elements of context block pointer array 404 and context block array 406 (i.e., "CONTEXT-BLOCK*[0]" and "CONTEXTBLOCK[0]") are used by scheduler 302 for designated purposes. Specifically, "CONTEXTBLOCK[0]" contains the context of scheduler 302 and "CONTEXTBLOCK*[0]" points to the context of the process that is currently running. Hence, if the process at the zeroth element of array 410 (i.e., "PROC_ENTRY [0]") is currently running, then "CONTEXTBLOCK*[0]" will be pointing at "CONTEXT 0" of "PROC_ENTRY [0]." If the process at the first element of array 410 (i.e., "PROC_ENTRY [1]") is currently running, then "CONTEXTBLOCK*[0]" will be pointing at "CONTEXT 1" of "PROC_ENTRY[1]." Correspondingly, "CONTEXTBLOCK*[0]" will point to "CONTEXT J" of "PROC_ENTRY[J]," if the process at the Jth element of array 410 is currently running.

Figure 5:
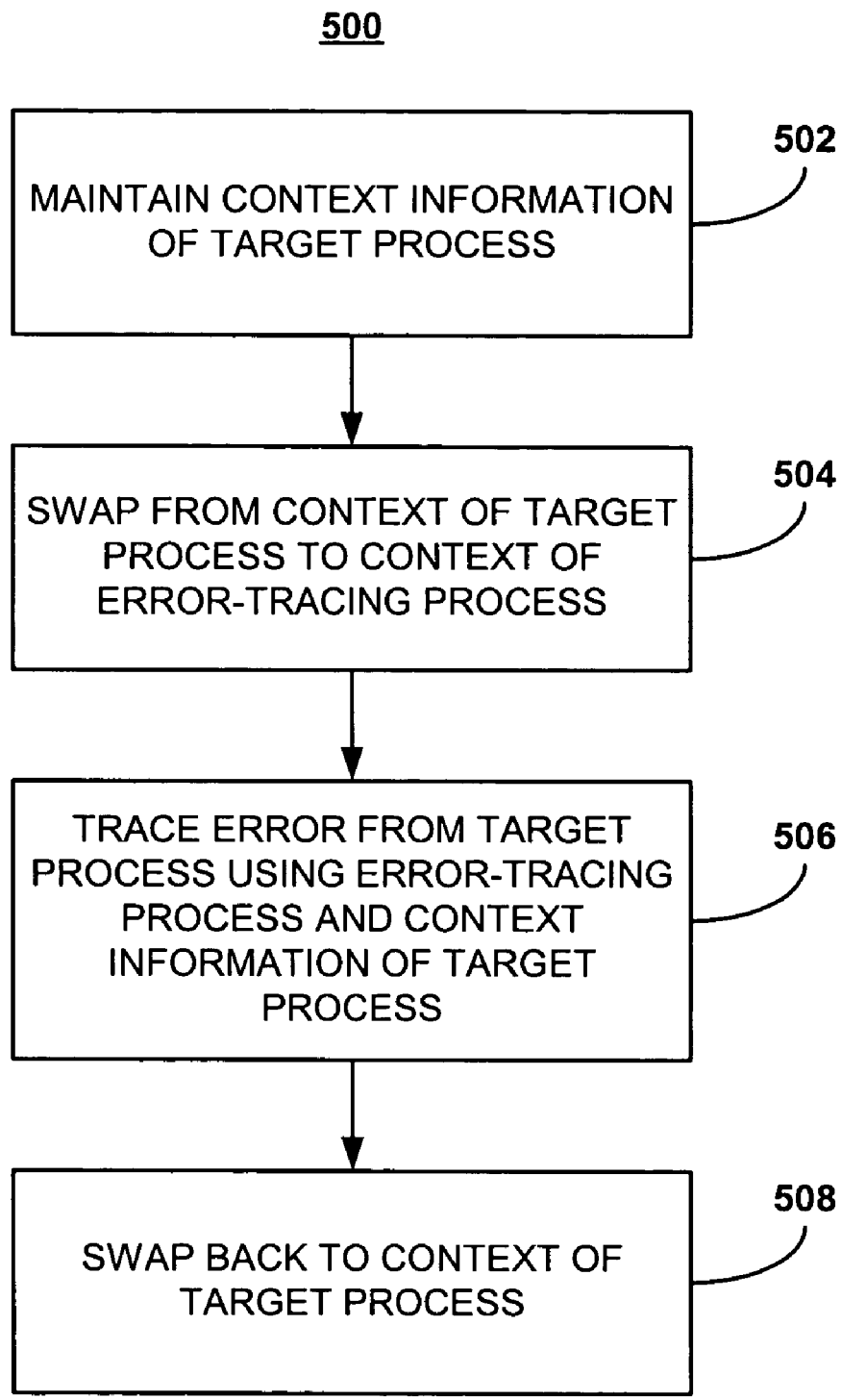
FIG. 5 illustrates an exemplary error-tracing method, consistent with features and principles of the present invention.

According to features and principles of the present invention, system 200 may implement an exemplary error-tracing method 500 illustrated in FIG. 5. Error-tracing method 500 is described below with reference to FIG. 4.

System 200 may begin by maintaining context information of a target process (block 502). System 200 may maintain the target process's context information by swapping from the context of the target process to another process. For example, if the target process is "PROC_ENTRY[0]," then its context information may be maintained by swapping from the context of "PROC_ENTRY[0]" to the context of another process, such as "PROC_ENTRY[1]." In one embodiment, system 200 may perform the swap by first doubly dereferencing current context pointer 402 to store the context information for "PROC_ENTRY[0]" in "CONTEXT 0." Next, system 200 may increment current context pointer 402 to point to the next context block pointer of array 404, which in this example is "CONTEXTBLOCK*[1]." System 200 may complete the context swap by adjusting current process pointer 408 to point to "PROC_ENTRY[1]," and setting "CONTEXTBLOCK[*0]" point to "CONTEXT 1" of "PROC_ENTRY[1]."

Since the context information for the target process is now stored in "CONTEXT 0," system 200 may continue to execute the other process (i.e., "PROC_ENTRY[1]") without affecting the context information for the target process. Eventually, system 200 may return from the "PROC_ENTRY[1]" to the target process and may continue to execute the target process by decrementing current context pointer 402 to point to the previous context block pointer of array 404, which in this example is "CONTEXTBLOCK*[0]," and adjusting current process pointer 408 to point to the target process. However, prior to returning from "PROC_ENTRY[1]," system 200 may make and store a copy of "CONTEXT 0" for use in error-tracing the target process.

After maintaining the context information of the target process (block 502), system 200 may swap from the context of the target process to the context of an error-tracing process (block 504). The error-tracing process may trace any errors without affecting the target process's context information stored in the copy of "CONTEXT 0." For example, system 200 may perform the swap by doubly dereferencing current context pointer 402 to store the target process's current context information in "CONTEXT 0." The target process's current context information may be different from the context information stored in the copy of "CONTEXT 0." Next, system 200 may increment current context pointer 402 (FIG. 4) to point to the next context block pointer of array 404, which will be "CONTEXTBLOCK*[1]." System 200 may complete the context swap by adjusting current process pointer 408 to point to "PROC_ENTRY[1]," and setting "CONTEXTBLOCK*[0]" to point to "CONTEXT 1" of "PROC_ENTRY[1]." System 200 may then execute the error-tracing process as "PROC_ENTRY[1]" to trace an error from the target process using the target process's context information previously stored in the copy of "CONTEXT 0" (block 506). System 200 may trace the error by logging the error information, analyzing the error information, displaying the error information, or performing any other operation that facilitates debugging.

Once system 200 finishes executing the error-tracing process, it may swap back to the context of the target process (block 508). For example, system 200 may decrement current context pointer 402 and set up the context for the target process using the context information stored at "CONTEXT 0." Restoring the context is platform specific (i.e., different platforms require different procedures to restore context), but system 200 may, for example, do it by restoring register values, flag values, the program counter, machine state, or any other information from "CONTEXT 0." Once the context of the target process is restored, system 200 may return from any system calls, interrupts, or software traps and proceed to continue executing the target process.

To better describe certain aspects of the present invention, FIG. 6 illustrates an exemplary macro 600 for configuring system 200 to implement error-tracing method 500. In accordance with features and principles of the present invention, macro 600 may be configured such that, when executed, it does not use global variables and functions calls for error tracing.

Exemplary macro 600 begins by generating a system call with a SYSCALL_REG_VALUE. This causes the OS of system 200 to save all the registers into a target process's context block at the time of the system call, make a copy of the target process's context block, and return. Macro 600 may also save the current stack backtrace, the state of other threads in system 200, or any other type of information. Macro 600 then writes the values of the arguments to macro 600 (i.e., cmd, symp, cat, mod, pipe, opt, datalen, and data) into a small "err" structure located on the stack (20 bytes in this case). In one embodiment, if possible, the compiler may perform folding operations to avoid extra accesses to memory or execution of extra instructions.

Finally, macro 600 makes a second system call with a SYSCALL_TRACE_ERR value and a pointer to the local "err" structure. The SYSCALL_TRACE_ERR and parameters in the local "err" structure may indicate which error handler or error-tracing process to use. The second system call may trace the error using accurate context information for the target process because the context in which the error occurred has been temporarily halted and stored in the copy of the target process's context block while the error-tracing process logs the error. Such operations allow system 200 to determine whether the error is critical and either reboot or drop into a debug monitor. Further, system 200 may perform any other process without allowing the context in which the error occurred to continue and potentially alter subsequent operations.

As explained above, macro 600 executes two system calls; one to save context information of a target process and one to swap to a context of an error-tracing process. Alternately, macro 600 may be configured to avoid saving the general purpose register information from the target process by implementing a simple check that prevents issue of the first system call. Regardless of whether macro 600 executes one or both system calls, macro 600 or similar code in executing software may be detected by using an analyzer to search for interrupt calls, instead of function calls, when an error exception occurs.

Features and principles of the present invention may be implemented in a computer-readable medium (e.g., floppy disk, CD-ROM, storage device, etc.) containing instructions for a system, such as system 200, to perform error-tracing processes described above.

The embodiments and aspects of the invention set forth above are only exemplary and explanatory. They are not restrictive of the invention as claimed. Other embodiments consistent with features and principles are included in the scope of the present invention.

In the foregoing description, various features are grouped together for purposes of streamlining the disclosure. This method of disclosure is not to be interpreted as reflecting an intention that the claimed invention requires more features than are expressly recited in each claim. Rather, as the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method of modifying a computer program provided in a computer-readable medium, comprising:
   maintaining context information of a target process by storing context information of the target process;
   following maintaining context information, swapping from a context of the target process to a context of an error-tracing process;
   tracing an error from the target process using the error-tracing process and the stored context information of the target process that was stored prior to swapping from the context of the target process, wherein the stored context information of the target process is accessed and error tracing is provided without running the target process and without affecting the stored context information of the target process; and
   modifying the computer-readable medium containing the computer program to eliminate the error based on results of tracing the error.

2. The method of claim 1, wherein maintaining the context information of the target process includes swapping from the context of the target process to a context of another process.

3. The method of claim 2, wherein swapping from the context of the target process to a context of the other process comprises:
   providing a plurality of context blocks for storing the context information of the target process and context information of the other process;
   providing pointers to each of the context blocks;
   providing an index to the pointers; and
   adjusting one of the pointers to point to the context block of the other process.

4. The method of claim 1, wherein the stored context information of the target process comprises information collected from general purpose registers during execution of the target process.

5. The method of claim 2, wherein swapping from the context of the target process to the context of the other process comprises:
   executing a system call to save machine state information from a context block of the target process at the time of the system call.

6. The method of claim 1, wherein swapping from the context of the target process to the context of the error-tracing process comprises:
   providing a plurality of context blocks for storing the context information of the target process and context information of the error-tracing process;
   providing pointers to each of the context blocks;
   providing an index to the pointers; and
   adjusting one of the pointers to point to the context block of the error-tracing process.

7. The method of claim 1, wherein swapping from the context of the target process to the context of the error-tracing process comprises:
   executing a system call to save information from a context block of the target process at the time of the system call and trace the error from the target process.

8. The method of claim 1, wherein tracing the error from the target process comprises:
   tracing the error from a leaf function that does not call any functions and remains a leaf function during the tracing of the error from the target process.

9. The method of claim 1, further comprising:
   swapping from the context of the error-tracing process back to the context of the target process after tracing the error from the target process.

10. A system for modifying a computer program, comprising:
    memory; and
    a processor, wherein the memory and processor are configured to perform a method comprising:
       maintaining context information of a target process by storing context information of the target process,
       following maintaining context information, switching from a context of a target process to a context of an error-tracing process,
       tracing an error from the target process using the error-tracing process and the stored context information of the target process that was stored prior to switching from the context of the target process, wherein the stored context information of the target process is accessed and error tracing is provided without running the target process and without affecting the stored context information of the target process, and
       modifying the computer program to eliminate the error based on results of tracing the error.

11. The system of claim 10, wherein maintaining the context information of the target process includes switching from the context of the target process to a context of another process.

12. The system of claim 11, wherein switching from the context of the target process to a context of the other process comprises:
    providing a plurality of context blocks for storing the context information of the target process and context information of the other process;
    providing pointers to each of the context blocks;
    providing an index to the pointers; and
    adjusting one of the pointers to reference the context block of the other process.

13. The system of claim 10, wherein the stored context information of the target process comprises information collected from general purpose registers during execution of the target process.

14. The system of claim 11, wherein switching from the context of the target process to the context of the other process comprises:
    executing a system call to save machine state information from a context block of the target process at the time of the system call.

15. The system of claim 10, wherein switching from the context of the target process to the context of the error-tracing process comprises:
    providing a plurality of context blocks for storing the context information of the target process and context information of the error-tracing process;
    providing pointers to each of the context blocks;
    providing an index to the pointers; and
    adjusting one of the pointers to reference the context block of the error-tracing process.

16. The system of claim 10, wherein switching from the context of the target process to the context of the error-tracing process comprises:
    executing a system call to save information from a context block of the target process at the time of the system call and trace the error from the target process.

17. The system of claim 10, wherein the error from the target process is traced from a leaf function that does not call any functions and the leaf function remains a leaf function during the tracing of the error from the target process.

18. The system of claim 10, wherein the memory and the processor are further configured to switch from the context of the error-tracing process back to the context of the target process after tracing the error from the target process.

19. A computer-readable storage medium containing instructions for configuring a computer to perform a method of error tracing, the method comprising:

maintaining context information of a target process by storing context information of the target process;

following maintaining context information, swapping from a context of the target process to a context of an error-tracing process; and tracing an error from the target process using the error-tracing process and the stored context information of the target process that was stored prior to swapping from the context of the target process, wherein the stored context information of the target process is accessed and error tracing is provided without running the target process and without affecting the stored context information of the target process.

20. The computer-readable medium of claim 19, wherein maintaining the context information of the target process includes swapping from the context of the target process to a context of another process.

\* \* \* \* \*